United States Patent [19]
Locker et al.

[11] Patent Number: 6,158,020
[45] Date of Patent: Dec. 5, 2000

[54] REMOTE JUMPER SET AND RESET

[75] Inventors: Howard Locker, Cary; Randall Scott Springfield, Chapel Hill; Daryl Carvis Cromer, Cary; David Benson Rhoades, Apex; James Peter Ward, Raleigh, all of N.C.

[73] Assignee: International Business Machines Corporation, Armonk, N.Y.

[21] Appl. No.: 09/060,279

[22] Filed: Apr. 14, 1998

[51] Int. Cl.[7] .................................................. G06F 11/00
[52] U.S. Cl. .................................. 714/13; 714/7; 714/14
[58] Field of Search ................................. 709/224, 220, 709/221, 223, 225; 714/4, 31, 7, 13, 14

[56] References Cited

U.S. PATENT DOCUMENTS

| | | | |
|---|---|---|---|
| 5,367,670 | 11/1994 | Ward et al. | 395/575 |
| 5,404,544 | 4/1995 | Crayford | 395/575 |
| 5,487,148 | 1/1996 | Komori et al. | 714/4 |
| 5,504,905 | 4/1996 | Cleary et al. | 713/100 |
| 5,761,085 | 6/1998 | Giorgio | 702/33 |
| 5,781,703 | 7/1998 | Desai et al. | 706/50 |
| 5,809,313 | 9/1998 | Gianni | 713/310 |
| 5,815,652 | 9/1998 | Ote et al. | 714/31 |

*Primary Examiner*—Robert W. Beausoliel, Jr.
*Assistant Examiner*—Pierre E. Elisca
*Attorney, Agent, or Firm*—George E. Grosser; Andrew Dillon

[57] ABSTRACT

A client on a network is provided with auxiliary low power logic, at the network adapter, that is always active and simulates network traffic (e.g. Ethernet format) normally sent under control of the main client system processor(s). This logic receives commands from the network manager, even when the system CPU is powered down or the system is not operational; information which allows the network manager to exercise broader control and perform maintenance and upgrades which would otherwise require service call for maintenance and reconfiguration of the client system. The auxiliary logic also can receive and interpret commands from the network that conform to a predefined format.

7 Claims, 8 Drawing Sheets

REMOTE JUMPER SET AND RESET

BACKGROUND OF THE INVENTION

1. Field of the Invention

The invention relates generally to the field of network-connected personal computers and, in particular, to control and reconfiguration of individual client systems over a network.

2. Background

With personal computers (PCS) being increasingly connected into networks to allow transfers of data among computers to occur, more operations such as maintenance and updating of applications and data collections are occurring over the network. As computers are also becoming essential to their users to perform their work it is desirable to shift the time when maintenance and updates occur to not interfere with productive work. It is also desired to perform maintenance remotely without a service call to drive up cost.

One solution to this problem has been wake up technology, such as IBM's Wake on LAN technology, which supports special signaling over a network to cause a client to power itself up. The network manager may then perform various operations on the client. This allows some degree of remote maintenance but there is a major class of system work that is hardware related and requires on-site service to perform the modification needed. Also, there is a major class of problems that prevent the operating system from loading so maintenance applications are not able to run even with the system powered up.

SUMMARY OF THE INVENTION

The present invention recognizes that certain normal hardware reconfiguration operations that involve selection as opposed to replacement, such as jumper switch positioning, are expensive and time consuming because a service person must come to the site and remove the system covers to make the desired changes. By so modifying the jumpers that they can be signal controlled and then providing logic to generate the requisite signals in response to special predefined network commands all without requiring software intervention at the client system, such "hardware" modifications can be performed by the network manager without requiring service call, without the client system being operational or even waking up the client system.

Indeed, the lack of a requirement for the system or particular software, such as the operating system to be running is a major distinction over other approaches to remote maintenance. For example, the processor clock can be changed to a correct clock rate for a new processor, by a remotely sent command, according to the invention. This would be a situation where the system without the change would not even be able to run its BIOS, let alone succeed in running the operating system. As a further example system flash has a plurality of operational modes which may be signal controlled, to deal with a corrupted flash image by allowing a "boot block recovery" (recovery using a backup image of BIOS).

While remote wakeup of client systems has made the network manager's support of client systems more convenient, it is limited, as indicated above, in that it requires software applications running at the client for maintenance operations or updates. Related patent application Ser. No. 09/024,231, entitled: FULL TIME NETWORK AUXILIARY FOR A NETWORK CONNECTED PC describes logic for responding to status information queries from a main computer over the network. According to the present invention auxiliary logic that communicates with the network adapter is always active as a result of trickle power. The auxiliary logic responds to signals that arrive from the network in a special predefined network format indicating a request for reconfiguration action at the client.

According to a preferred implementation, the signals are received from the network and detected on the client side of the "physical layer" of the network controller. That is, the physical layer that interfaces to the LAN and sends and receives analog packet signals. By so configuring the packet to have the characteristics of a standard network packet, it passes through the network to the auxiliary logic as if a normal packet created by the network manager system. In this regard, it is recognized, by the invention, that it is not desired to change from existing PC network structures and protocols and the major installed infrastructure of PC networks. Hence, according to the invention, the logic is powered to be essentially always active and detects normal packet signal traffic (e.g. Ethernet format) sent from and received by the client system. The predefined special packets trigger the logic to send signals to signal-controlled jumpers according to the invention to effect reconfiguration without even the requirement that the system be functional.

BRIEF DESCRIPTION OF THE DRAWINGS

A presently preferred implementation for the invention will now be described in detail with reference to the drawings wherein.

DESCRIPTION OF THE PREFERRED EMBODIMENT

Figure 1:
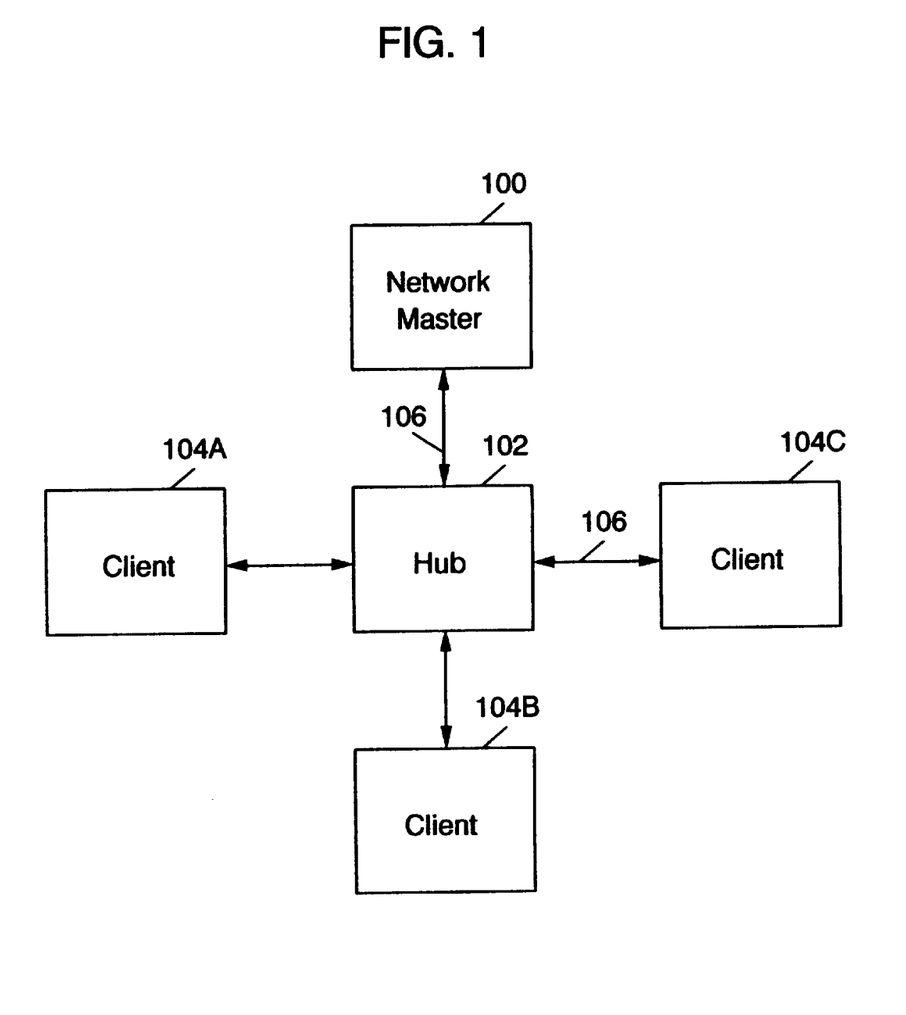
FIG. 1 is a block diagram of a network arrangement suitable for implementation of the invention.

Referring to FIG. 1, a network manager system 100 is connected to a hub 102 by a LAN connector bus 106. Respective client systems 104A–C also connect to the hub 102 through respective LAN busses 106. The preferred form of network conforms to the Ethernet specification and uses such hubs. It will be appreciated however that other forms of networks such as token ring may be implemented to include the invention.

Figure 2:
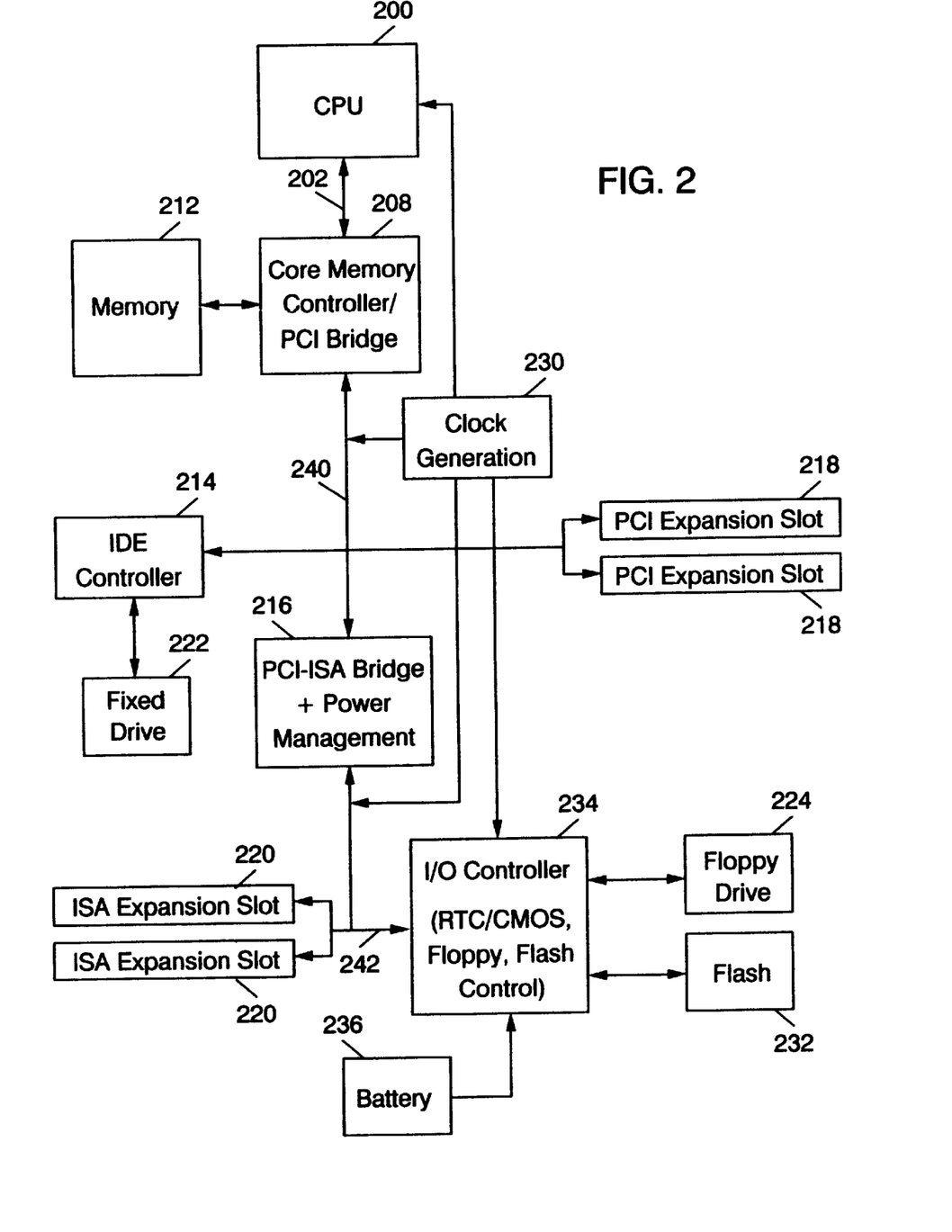
FIG. 2 is a block diagram of a client system suitable for implementation of the invention.

A computer system suitable for use as a client station 104 is indicated in FIG. 2. A central processing unit (CPU) 200 is connected by address, control and data busses 202 to a memory controller and PCI bus bridge chip 208. System memory 212 is connected to the chip 208. Connected to standard PCI expansion bus 240 are the memory controller PCI bridge chip 208, IDE device controller 214, connector slots 218, and a PCI bus to ISA bus bridge chip 216 which typically also includes power management logic. ISA standard expansion bus 242 with connector slots 220 is connected to bridge chip 216. It will be appreciated that other expansion bus types may be used to permit expansion of the system with added devices and it is not necessary to have two expansion busses.

For an intelligent client station 104 there would normally input devices and data storage devices such as fixed and a floppy drive 222 and 224. The fixed drive 222 is connected to IDE controller 214 where as the floppy drive 224 is connected to I/O controller 234. IO controller 234 is connected to ISA bus 242 and also includes an interface for Flash memory 232, which contains microcode, that system 104 will execute on power on. The flash memory 232 is an electrically erasable programmable read only memory (EEPROM) module and includes BIOS that is used to interface between the IO devices and operating system. IO controller 234 also CMOS which is used to store system configuration data. That is the CMOS will contain values, which describe the present configuration of the system 104. For example CMOS, contains information describing the list of IPL devices set by a user and the sequence to be used for a particular power method, the type of display, the amount of memory, time, date, etc. Furthermore, these data are stored in CMOS whenever a special configuration program, such as configuration/setup is executed. IO controller 234 is supplied power from battery 236 to prevent loss of configuration data in CMOS.

Figure 3:
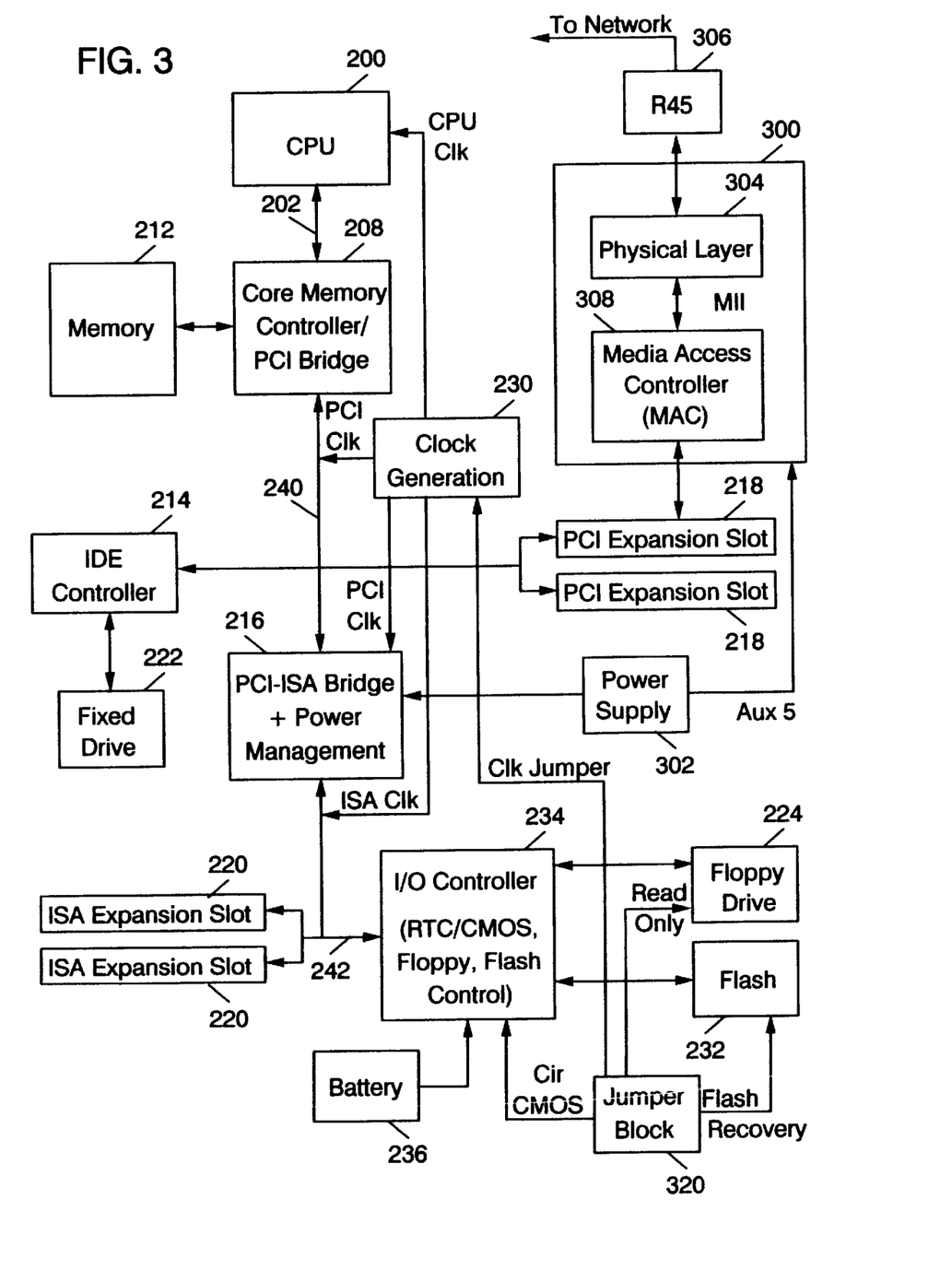
FIG. 3 is a block diagram of a system client with normal network connection circuitry.

Now, referring to FIG. 3, a client system 104, has a network adapter 300, which may, for example be plugged into one of connector slots 218. The client system 104 is shown with a special power supply 302 which supplies full normal system power and has a auxiliary power main Aux 5 which supplies full time power to the power management chip 216 and the network adapter 300. This enables the system, as is known, to respond to a wakeup signal from network adapter 300 and power up the system. The network adapter 300 is shown as two elements the physical layer 304 which conditions analog signals to go out to the network, for example an Ethernet network over an R45 connector 306 as is well known. A media access controller (or MAC) 308 processes the network signals in digital form and connects to the PCI bus 240. If the incoming signal conforms to Magic Packet form it is a wakeup command and the MAC 308 issues a WOL signal to cause the power supply to energize the client system 104. The adapter 300, it should be appreciated, may be added as an adapter card (as shown) or implemented directly on the system motherboard. To support wake up operation it is powered off the full time auxiliary line Aux 5.

The client system 104 of FIG. 3 also contains a jumper block 320, which is used for hardware configuration. Jumper block 320 is used to create signals CLK jumper to Clock generation module 230. Module 320 based on input from signals CLK jumper sets the clock speeds for the CPU 200, PCI bus 240, and ISA bus 242. This allows for PCI bus operation of 25, 33, 66 Mhz and CPU bus operation of 66 or 100 Mhz CPU internal operation of 100–300 Mhz. The jumper block 230 also provides a hardware mechanism to clear or reset the CMOS in IO controller 234, select whether floppy drive 224 is a read only or a read-write device, and place flash module 232 in a boot block recovery mode. The invention may be applied to various devices which have a plurality of operational modes which may be controlled by a switch setting.

Figure 4:
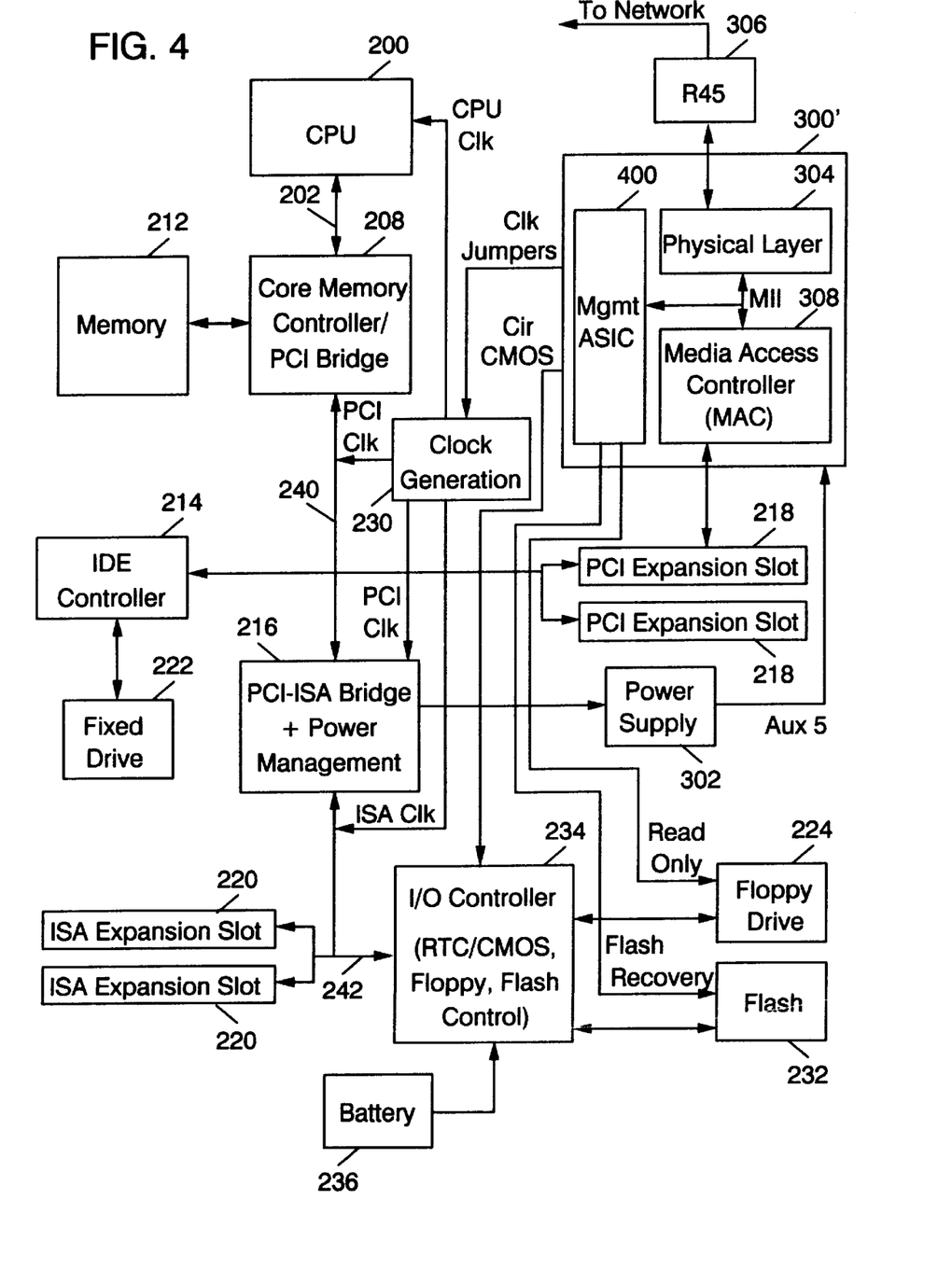
FIG. 4 is a block diagram of a system client with added logic coupled to the network connection circuitry for receiving and executing a command.

The client system 104 of FIG. 4 has a specially modified network adapter 300' with a logic module 400 connected at the MII bus that extends between the physical layer 304 and the MAC 308. This logic may be a "hard wired" ASIC or a programmed general-purpose processor programmed as described below. By so connecting the logic 400 at the MII bus, it can send and receive network packets using the physical layer 304. The logic 400 according to the invention accepts data the physical layer 304 and provides control to signals to client system 104. With the trickle power supplied on bus Aux 5 of power supply 302 the logic 400 is preferably powered full time.

Figure 5:
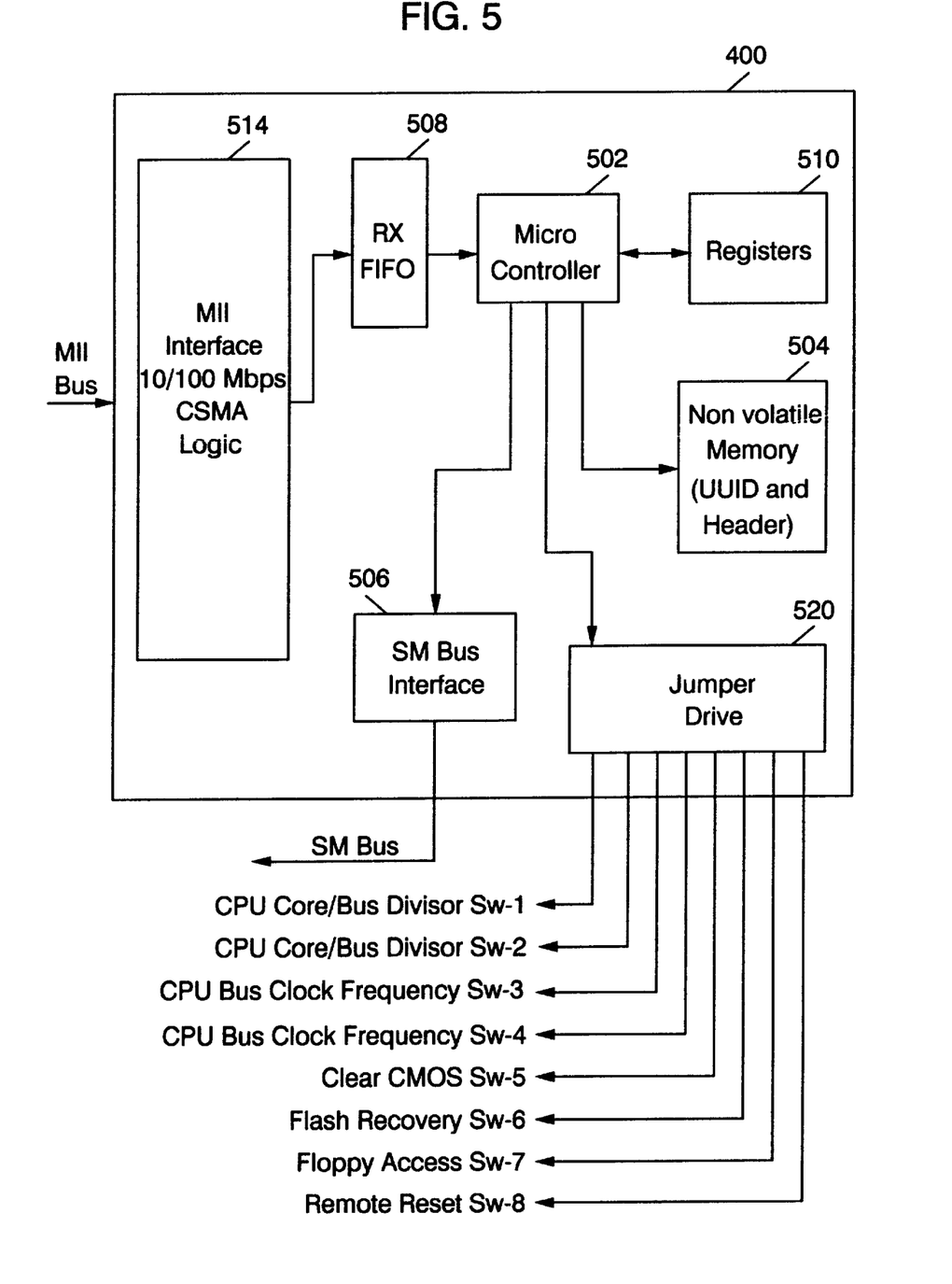
FIG. 5 is a block diagram indicating chip modules connected to perform the role of the special purpose logic according to the invention.

Component modules of the logic 400 are indicated in FIG. 5. Signal are received from MII bus by interface unit 514 and passed to RX FIFO 508. Microcontroller 502 coordinates the processing of information according invention and cooperates with jumper drive logic 520. The microcontroller will the non-volatile memory 504, to store values for jumper logic 520. When a network packet is received it process the information according to the invention and determine whether or not to update jumper values in non-volatile memory 504 and change drive states of logic 520. Furthermore non-volatile memory 504 retains the universal identifier (UUID) for the client system and unique system data. A System Management (SM) bus interface 506 to the system 104 for programming non-volatile memory 504 and accessing status registers 510.

Figure 6:
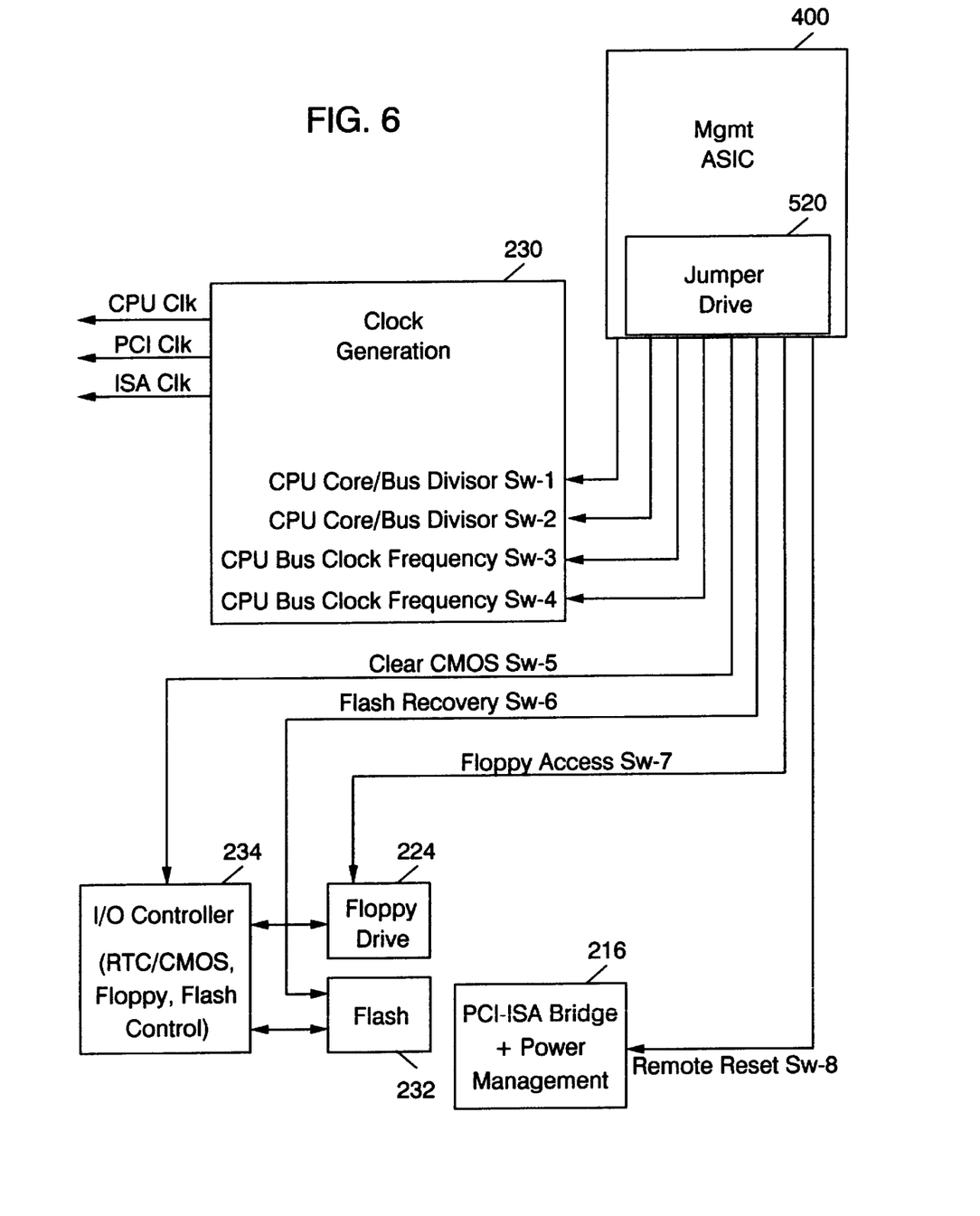
FIG. 6 is a simplified block diagram showing selected system logic to drive jumpers settings.

Referring to FIG. 6, the jumper drive logic 520 provides hardware configuration. Jumper drive logic 520 sends the signals CLK jumper to Clock generation module 230, to set the clock speeds for the CPU 200, PCI bus 240, and ISA bus 242. The jumper block 520 also provides the clear or reset the CMOS in IO controller 234, the read select to floppy drive 224, remote system reset to power management 216 and boot block recovery to flash module 232.

Figure 7:
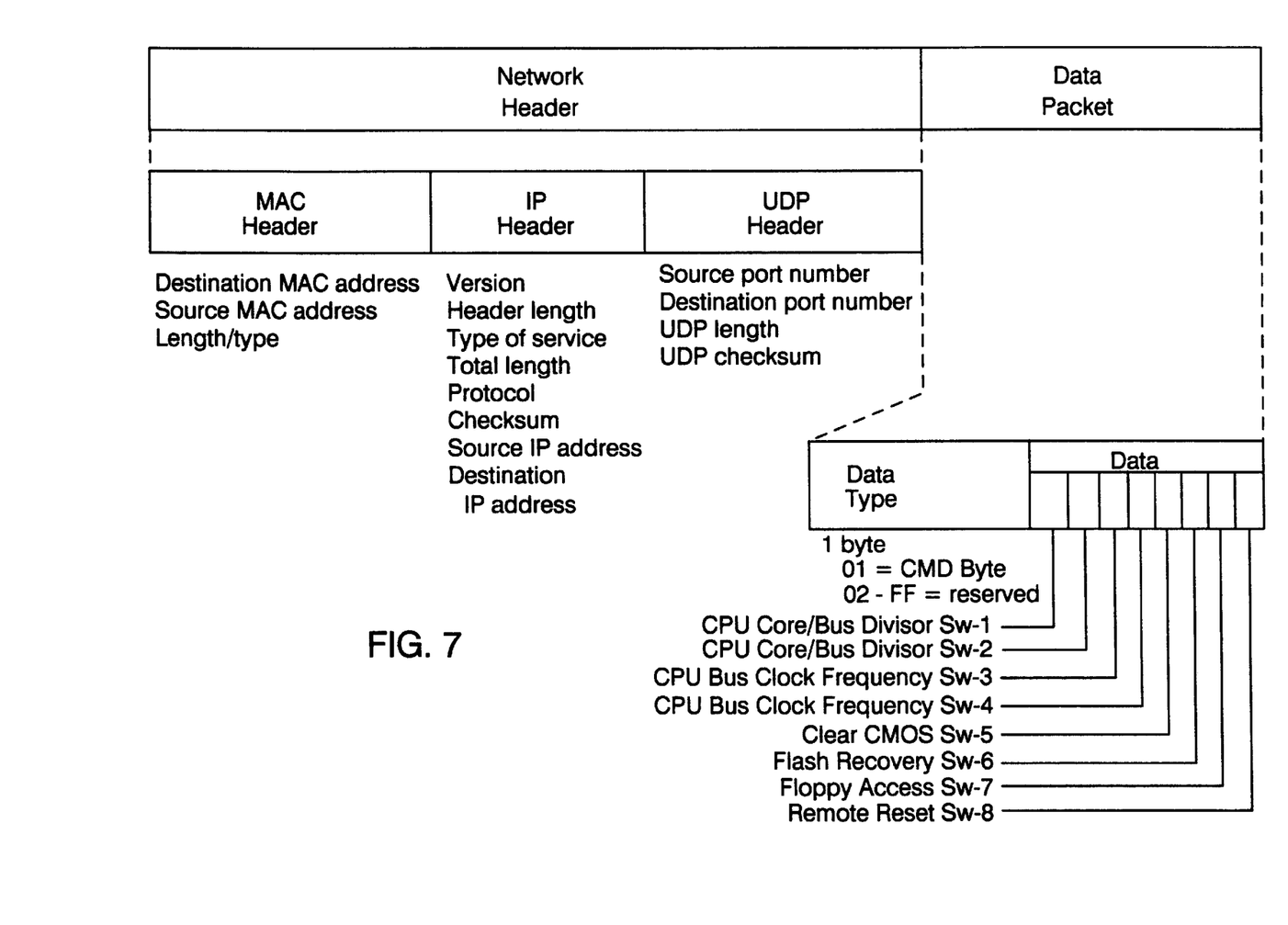
FIG. 7 is a diagrammatic representation of a packet of a kind that might be received for a LAN system based on an Ethernet specification with data areas for reception and respectively according to the invention.

A standard packet including a network header and data packet as might be sent over an Ethernet network is indicated in FIG. 7. The network header includes a MAC header, an IP header and UDP header as is known to provide addresses, identifiers and other information for assuring correct transfer. The data packet includes the information content to be transferred. For reception, the straight Magic Packet content is the known wake up command. With the special extensions as indicated the network manager may trigger or turn off activity of the logic 400.

For the reception of packets received by logic 400, the data type and data patterns indicated in FIG. 7 are preferably followed according to the invention. First data type is used to set up a category of data and then a data portion provides specific information. The data type indicated would, for example, values for jumper drive logic.

Figure 8:
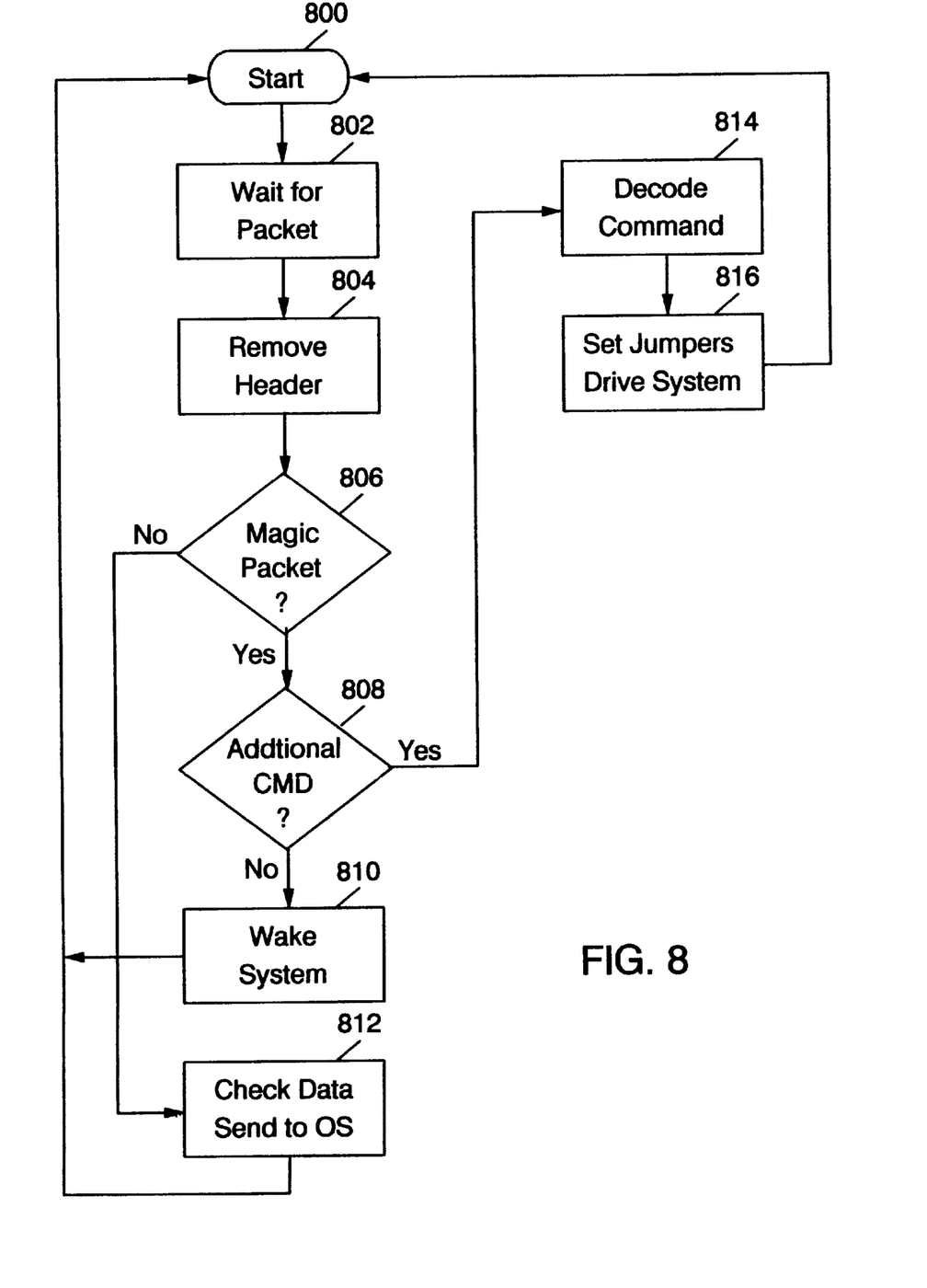
FIG. 8 is a flow chart indicating logic for interpreting the received data packets of FIG. 7, which may be implemented as hard logic or using a programmed general purpose processor.

Referring to FIG. 8, illustrates to process used by microcontroller 502. The microcontroller 502 waits for a packet (802) and on receiving one removes the header (804) and determines if data packet (806) conforms to the Magic Packet specification. If not the data is sent to the Operating system (812) and the process returns to 800. If so, the packet is checked for additional data. If there is no additional data a wake up signal is sent (810). If there is additional data, a wake up is not sent and packet is decode (814). Based on contents of packet the jumper values are updated in non-volatile ram 504 and jumper drive logic is activated (816).

The invention has been described with reference to preferred implementations thereof but it will be appreciated that variations and modifications within the scope of the claimed invention will be suggested to those skilled in the art. For example, the invention may be implemented on networks other than Ethernet networks such as token ring networks or used to control other signal-controlled hardware of a system.

What is claimed is:

1. A client system, for a personal computer network, having a network adapter that receives signal packets in a predefined digital form from said network and presents them at a client side, said client system comprising:

at least one system device having plural modes of operation selectable by switch settings;

at least one signal responsive switch, coupled to said system device, that sets the mode of said system device in response to selected signals; and auxiliary logic, coupled to said signal responsive switch, that receives said signal packets from said client side and responds to said signal packets having a predefined digital format to produce said selected signals which are applied to said signal responsive switch, whereby hardware configuration may be effected over said network.

2. The client system according to claim 1, wherein said personal computer network conforms to the Ethernet specification and said signals on said network are digitally encoded analog signals.

3. The client system according to claim 1, wherein said auxiliary logic selectively applies said selected signals to one of a plurality of signal controlled switches respective of said predefined signal received from said network.

4. The client system according to claim 1, wherein said auxiliary logic is trickle powered by a power supply and is always active when said power supply is energized.

5. The client system according to claim 1, further comprising a CPU wherein said auxiliary logic selectively applies said selected signals to one of a plurality of signal controlled switches respective of said predefined signal received from said network, independently of any support from said CPU.

6. A client system, for a personal computer network, having a network adapter that receives signal packets in a predefined digital form from said network and presents them at a client side and including a power supply which has plural modes of operation, including on and off, respectively selectable by switch settings, said client system comprising:

at least one signal responsive switch, coupled to said power supply, that sets the mode of said power supply in response to selected signals; and auxiliary logic, coupled to said signal responsive switch, that receives said signal packets from said client side and responds to said signal packets having a predefined digital format to produce said selected signals which are applied to said signal responsive switch, whereby said power supply may be set off and then on to reset said client system over the network.

7. A client system, for a personal computer network, having a network adapter that receives signal packets in a predefined digital form from said network and presents them at a client side and including startup microcode memory with switch selectable sections, said client system comprising:

at least one signal responsive switch, coupled to said startup microcode memory, that sets a current section for said memory in reponse to selected signals; and auxiliary logic, coupled to said signal responsive switch, that receives said signal packets from said client side and responds to said signal packets having a predefined digital format to produce said selected signals which are applied to said signal responsive switch, whereby microcode may be selected by said memory section to allow recovery using backup microcode.

* * * * *